INVENTORS.
JOSEPH F. LARKIN
CHARLES W. FLUHRER
BY
ATTORNEY

INVENTORS.
JOSEPH F. LARKIN
CHARLES W. FLUHRER

ATTORNEY

May 5, 1970 C. W. FLUHRER ET AL 3,509,690
MACHINE FOR ASSEMBLING ELECTRICAL COMPONENTS IN A CARD PACKAGE
Filed Dec. 20, 1967 6 Sheets-Sheet 4

INVENTORS.
JOSEPH F. LARKIN
CHARLES W. FLUHRER

BY

ATTORNEY

INVENTORS.
JOSEPH F. LARKIN
CHARLES W. FLUHRER
BY
ATTORNEY

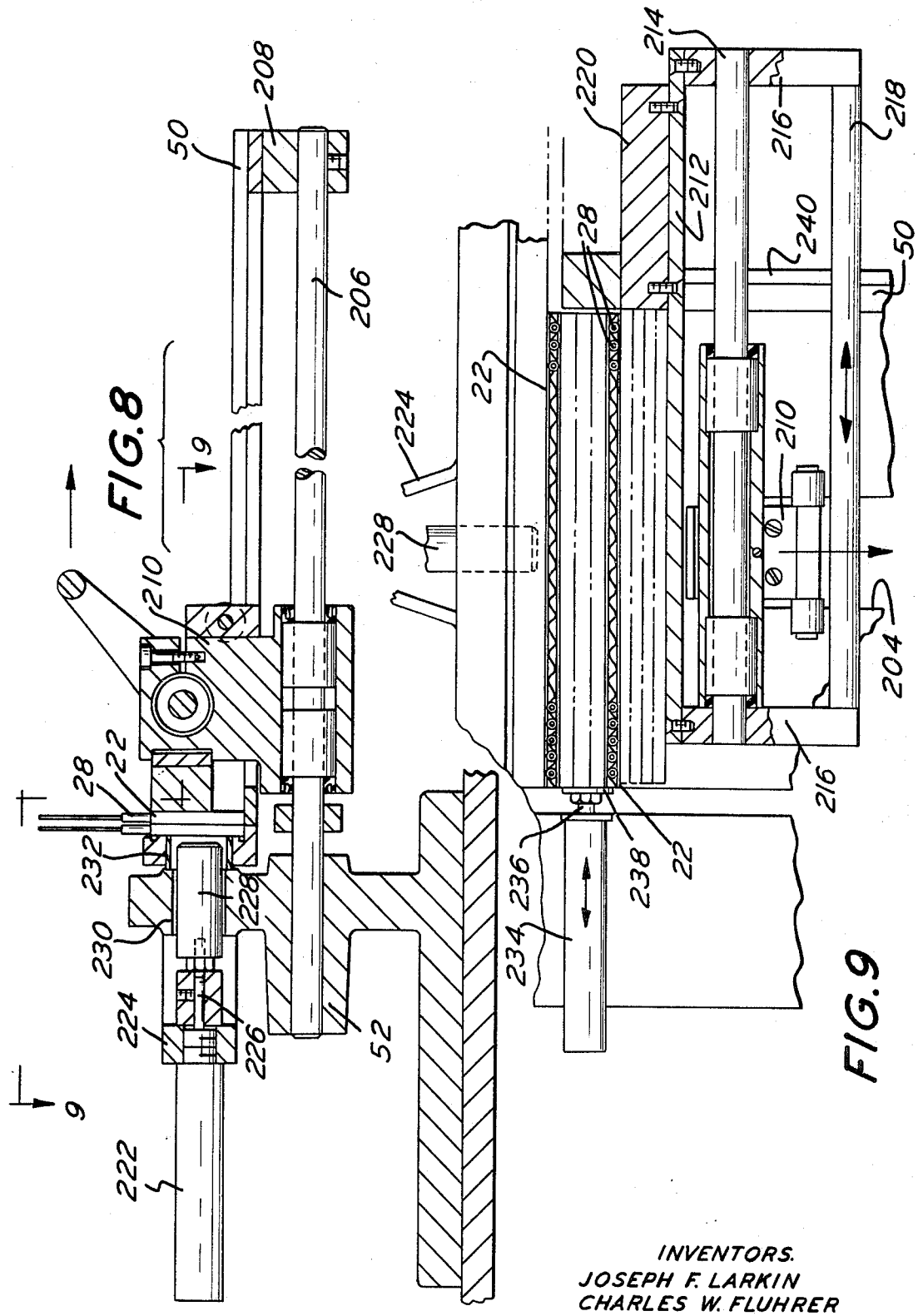

United States Patent Office 3,509,690
Patented May 5, 1970

1

3,509,690
MACHINE FOR ASSEMBLING ELECTRICAL
COMPONENTS IN A CARD PACKAGE
Charles W. Fluhrer, Philadelphia, and Joseph F. Larkin,
Holland, Pa., assignors to TRW Inc., a corporation of
Ohio
Filed Dec. 20, 1967, Ser. No. 692,157
Int. Cl. B65b 5/04
U.S. Cl. 53—246                                  7 Claims

ABSTRACT OF THE DISCLOSURE

A machine for assembling electrical components of the type having a central body portion and terminal wires extending axially from opposite ends of the body portion in a corrugated paper card package with the components arranged in side-by-side relation along one edge of the card. The machine comprises a horizontally extending track for supporting the cards in a vertical position. A hopper is mounted at one end of the track for successively feeding the cards to the track. Means is mounted below the track for moving the cards along the track from the hopper to the other end of the track. A transfer mechanism is mounted over the track for successively transferring electrical components from a hopper to a position over the track. The transfer mechanism feeds the electrical components in a vertical position to a position over the upper edge of the cards so that the electrical components drop into the edge of the card with the terminal wires extending into the corrugations in the cards. Means is provided at the other end of the track for moving the filled cards off the track and onto a platform from which the cards can be easily transferred to a box.

Background

In the manufacture and sale of electrical components, such as resistors, capacitors, diodes, etc., it is often desirable to package the components for shipment to a customer with the components being arranged in an oriented manner. One type of package which has been found to be acceptable to customers for the electrical components is shown in United States Letters Patent No. 3,214,230, issued Sept. 10, 1940, to Walter S. Greenburg, entitled "Packaging Means for Small Resistor Units." The package shown in this patent is for electrical components of the type comprising a central body portion, generally cylindrical in shape, and a pair of terminal wires extending axially from opposite ends of the body portion. The package comprises a rectangular card of a corrugated paper board of the type having a pair of face sheets glued to opposite sides of a strip of corrugated paper. This provides the card with a plurality of pockets along an edge of the card. The electrical components are mounted on the card with a terminal wire of each of the components extending into a separate pocket in the card and the end of the body portion of the component seated on the edge of the card. Thus, the components are arranged in side-by-side, parallel relation along an edge of the card. A plurality of the cards containing the components are mounted in a box for shipment to the customer. Although the electrical components can be inserted in the cards by hand, it is desirable to have a machine for automatically inserting the components in the cards as a continuous operation and then arranging the filled cards so that they can be easily transferred to a box.

2

Summary

It is an object of the present invention to provide a novel machine for assembling electrical components in a card package.

It is another object of the present invention to provide a novel machine for assembling electrical components in card packages as a continuous operation.

It is still another object of the present invention to provide a machine for assembling electrical components in a card package in which the card is moved along a horizontal track and the electrical components are successively fed to and assembled on the card in side-by-side relation.

Other objects will appear hereinafter.

Brief description of drawings

For the purpose of illustrating the invention, there is shown in the drawings a form which is presently preferred; it being understood, however, that this invention is not limited to the precise arrangements and instrumentalities shown.

FIGURE 8 is a sectional view taken along line 8—8 of FIGURE 1.

FIGURE 9 is a top plan view taken along line 9—9 of FIGURE 8.

Descripiton of invention

Figure 10:
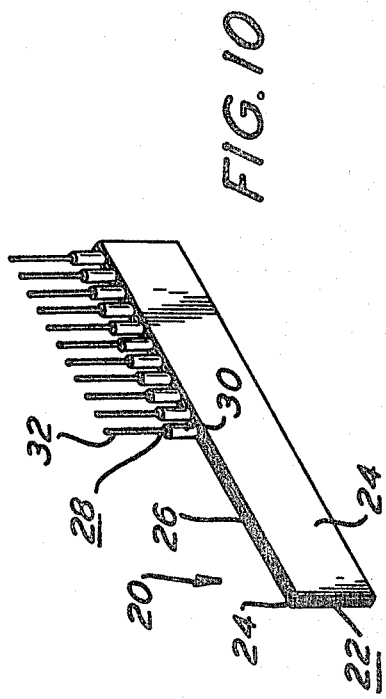
FIGURE 10 is a perspective view of a package formed by the machine of the present invention.

Referring initially to FIGURE 10, there is shown the card package, generally designated as 20, formed by the machine of the present invention. The package 20 comprises a rigid rectangular card 22 of corrugated paper board of the type having a pair of face sheets 24 glued to opposite sides of a strip 26 of corrugated paper. The face sheets 24 form with the corrugated strip 26 a plurality of pockets along one elongated edge of the card 22. The electrical components, generally designated as 28, each comprises a cylindrical body portion 30 and a pair of terminal wires 32 (only one of which is shown in FIGURE 10) extending axially from the ends of the body portion 30. The electrical components 28 are mounted on the card 22 by inserting one of the terminal wires 32 of each of the components into a separate one of the pockets along the elongated edge of the card until the end of the body portion 30 is seated on the edge of the card. Thus, the electrical components 28 are arranged in side-by-side, parallel relation along the elongated edge of the card 22.

Figure 1:
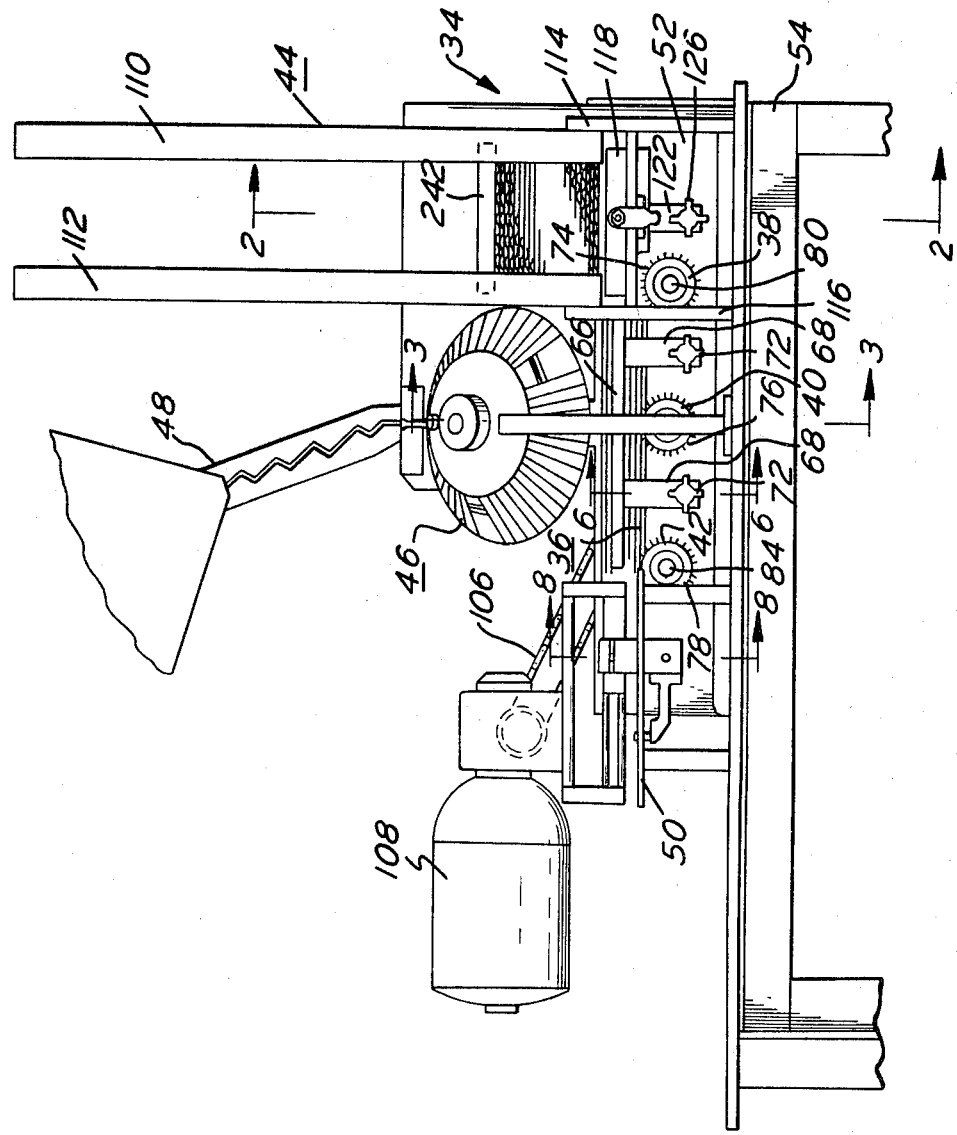
FIGURE 1 is a front elevational view of the machine of the present invention.

Referring to FIGURE 1, the machine of the present invention for assembling the package 20 is generally designated as 34. Machine 34 in general comprises a horizontally extending track 36 adapted to support the cards 22 in a vertical position along the elongated edges of the cards. Three drive wheels 38, 40 and 42 are mounted below the track 36 and at spaced intervals along the track. The drive wheels are adapted to engage the bottom elongated edge of ahe cards 22 and move the cards along the track. A hopper 44 is mounted at one end of the track 36 and is adapted to consecutively and continuously feed the cards 22 to the track. A transfer mechanism 46 is mounted above the track 36 substantially intermediate the ends of the track. The transfer mechanism is adapted to consecutively and continuously transfer electrical components 28 from a hopper 48 to an upright position over the cards 22 on the track so as to drop the components into the pockets in the upper elongated edge of the cards. A platform 50 is mounted at the other end of the track 36 and receives the assembled card packages 20. The assembled packages 20 are supported on the platform 50 so that they can be easily removed for placement in a box.

Figure 6:
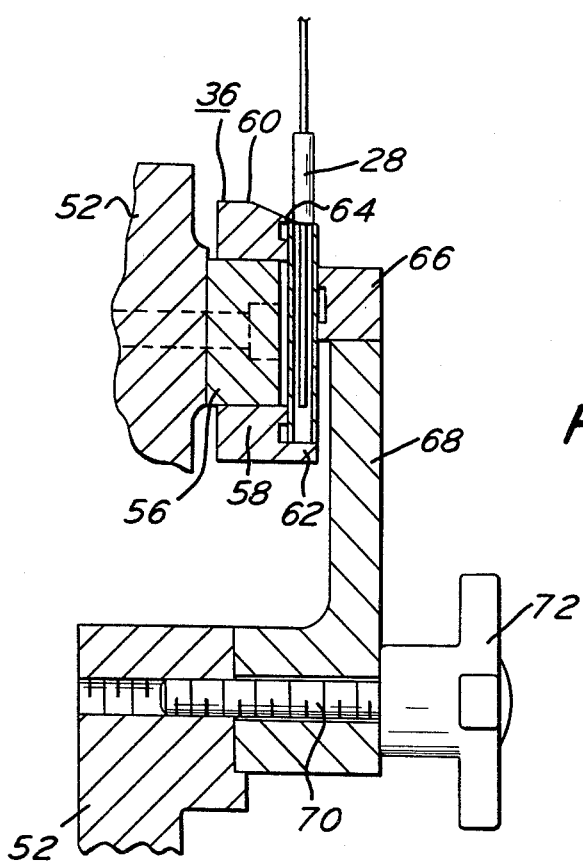
FIGURE 6 is a sectional view taken along line 6—6 of FIGURE 1.

More specifically, the machine 34 comprises an elongated base 52 mounted on a supporting frame 54. The track 36 comprises a plate 56 secured to and extending horizontally along the base 52 (see FIGURE 6), a lower rail 58 secured to and extending along the bottom edge of the plate 56, and an upper rail 60 secured to and extending along the upper edge of the plate 56. The lower rail 58 has a ledge 62 which extends horizontally beyond the front of the plate 56, a distance sufficient to support the bottom edge of the cards 22. The upper rail 60 has a ledge 64 which extends horizontally beyond the front of the plate 56 a distance sufficient to extend over the upper edge of a face sheet 24 of the cards 22. The vertical distance between the ledges 62 and 64 is equal to the height of the cards 22. A guide plate 66 extends horizontally across the front of the track plate 56 in spaced, parallel relation thereto. The guide plate 66 is spaced from the track plate 56 a distance such that the cards 22 can pass therebetween with the guide plate supporting the cards in an upright position. The guide plate 66 is supported on a pair of spaced brackets 68 which extend vertically downward from the guide plate and are secured to the base 52 by bolts 70 (see FIGURES 1 and 6). The bolts 70 have knobs 72 on the front ends to provide for ease of removing the guide plate 66 in the event that the cards 22 become jammed in their movement along the track 36.

The drive wheels 38, 40 and 42 are mounted on the base 52 below the track 36 in horizontal alignment. The drive wheel 38 is positioned at the end of the track 36, the right hand end as viewed in FIGURE 1. The axis of the center drive wheel 40 is spaced from the axis of the end drive wheel 38 a distance slightly less than the length of a card 22, and the other end drive wheel 42 is spaced a similar distance from the center drive wheel 40. The track 36 extends beyond the end drive wheel 42 a distance slightly greater than the length of the card 22. The drive wheels 38, 40 and 42 have a plurality of pins 74, 76 and 78 respectively extending radially outwardly thereform and uniformly spaced around the periphery of the wheels. The pins are spaced apart around the periphery of the wheels a distance equal to the spacing between the corrugations of the cards 22. The wheels 38, 40 and 42 are positioned vertically so that the periphery of the wheels extend to the level of the upper surface of the ledge 62 of the lower rail 58 and the pins in their upright position project beyond the upper surface of the ledge 62. The ledge 62 has three openings therein (not shown) through which the drive wheels 38, 40 and 42 extend.

Figure 3:
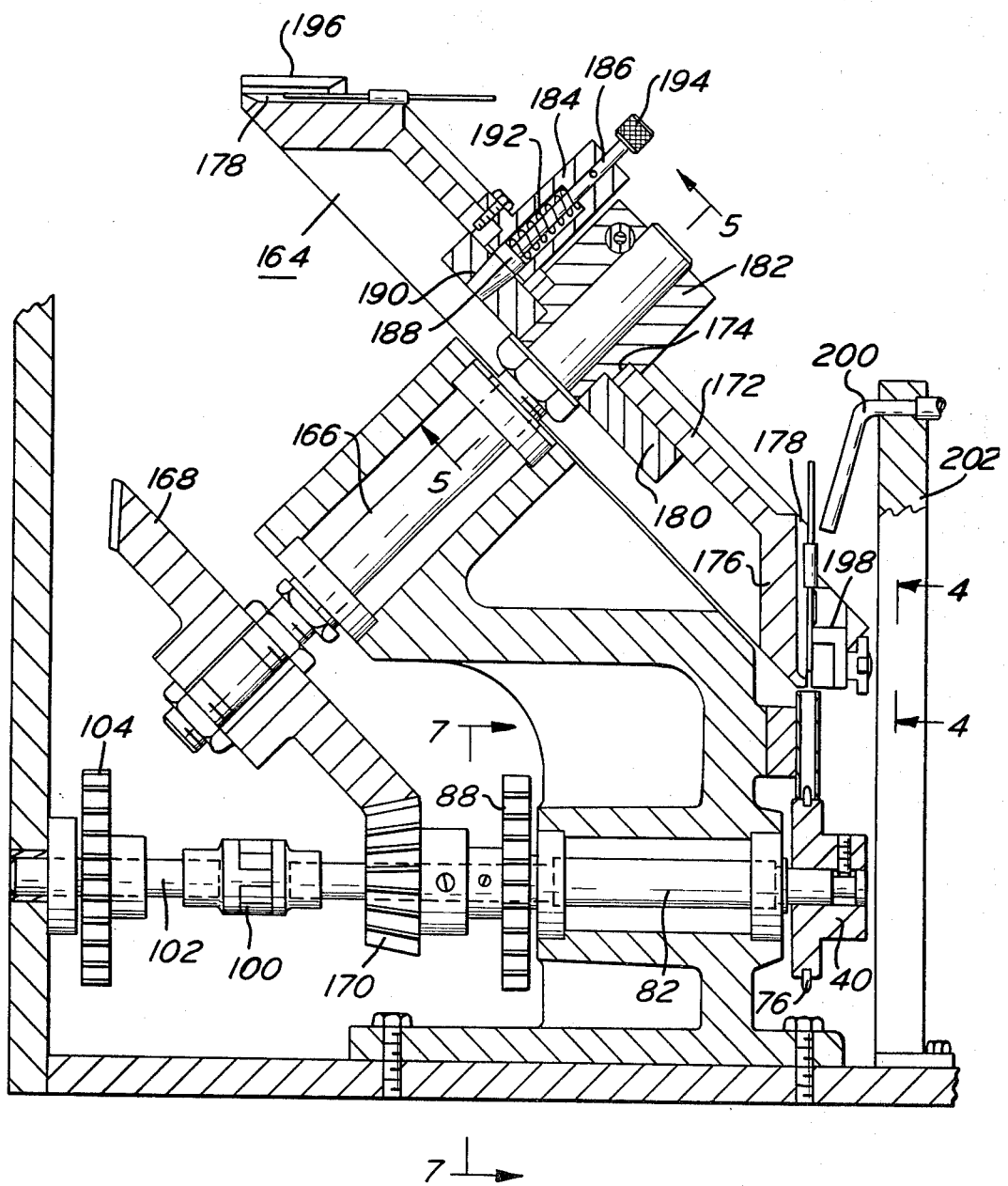
FIGURE 3 is a sectional view taken along line 3—3 of FIGURE 1.
Figure 7:
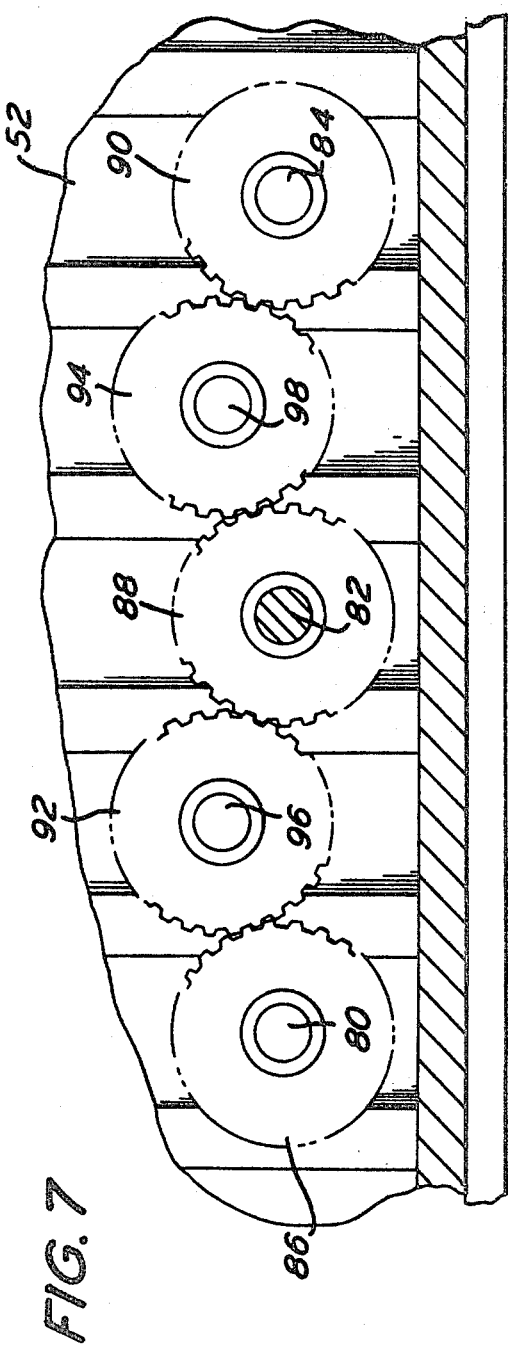
FIGURE 7 is an elevational view of the card drive mechanism taken along line 7—7 of FIGURE 3.

The drive wheels 38, 40 and 42 are mounted on shafts 80, 82 and 84 respectively. The shafts 80, 82 and 84 extend horizontally through and are rotatably supported on the base 52. As shown in FIGURE 7, gears 86, 88 and 90 are mounted on the shafts 80, 82 and 84 respectively at the back of the base 52. An idler gear 92 is provided between the gears 86 and 88, and a second idler gear 94 is provided between the gears 88 and 90. The idler gears 92 and 94 are mounted on shafts 96 and 98 respectively which are rotatably supported on the base 52. As shown in FIGURE 3, the shaft 82 is connected through a coupling 100 to a shaft 102 on which is mounted a drive gear 104. The drive gear 104 is connected by an endless chain 106 to a drive motor 108 (see FIGURE 1) Thus, the motor 108 rotates the shaft 82 which, in turn, rotates the shaft 80 through the gears 88, 92 and 86 and the shaft 84 through the gears 88, 94 and 90. This rotates the drive wheels 38, 40 and 42 in unison at the same speed and in the same direction.

Figure 2:
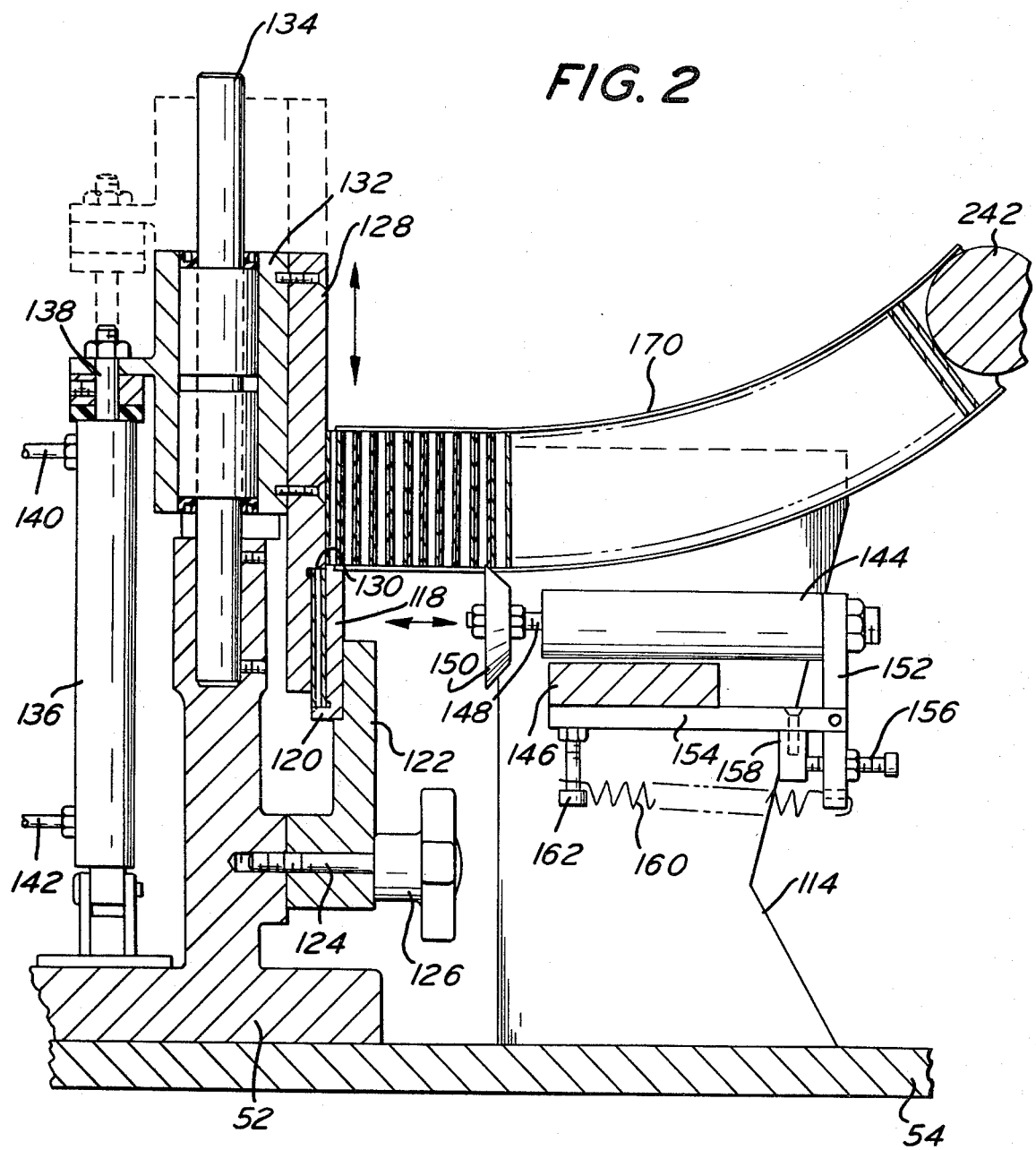
FIGURE 2 is a sectional view taken along line 2—2 of FIGURE 1.

Referring to FIGURES 1 and 2, the card hopper 44 comprises a pair of U-shaped guide rails 110 and 112 arranged in spaced, parallel relation with their open sides facing each other. The guide rails 110 and 112 are mounted on brackets 114 and 116 respectively adjacent the right hand end of the track 36, with the guide rail 112 being over the drive wheel 38. The brackets are mounted on the supporting frame 54. The guide rails 110 and 112 extend vertically downward and then are curved to extend horizontally to a position in horizontal alignment with the tracks 36 but with the bottom arms of the guide rails vertically above the track 36. The sides of the guide rails 110 and 112 are spaced apart a distance substantially equal to the length of the cards 22 and the arms of each of the guide rails are spaced apart a distance substantially equal to the height of the cards. Thus, the cards 22 can fit in stacked relation between the guide rails 110 and 112.

At the end of the guide rails 110 and 112 adjacent the base 52, a vertical plate 118 extends across the bottom of the guide rails and extends to the track 36. The plate 118 has a ledge 120 extending horizontally from its bottom edge toward the base 52. The ledge 120 is in direct vertical and horizontal alignment with the ledge 62 of the lower rail 58 and is of width equal to the thickness of the cards 22. The plate 118 is mounted on a vertically extending bracket 122 which is secured to the base 52 by a bolt 124 having a knob 126 on its end. Since the plate 118 extends to the track 36, the ledge 120 has an opening therethrough through which the drive wheel 38 extends.

A vertically extending plunger plate 128 extends across the ends of the guide rails 110 and 112 which are adjacent the base 52. The surface of the plunger plate which faces the ends of the guide rails 110 and 112 has a recess along its bottom edge which provides a horizontally extending downwardly facing ledge 130. The ledge 130 is of a depth equal to the thickness of the cards 22 and extends directly over the ledge 120 of the plate 118. The plunger plate 128 is mounted on a sleeve 132 which is slidably mounted on a vertical post 134 projecting upwardly from the base 52. An air cylinder 136 is mounted in a vertical position on the base 52. The piston rod 138 of the air cylinder 136 extends from the upper end of the air cylinder and is connected to the sleeve 132. The air cylinder has inlet ports 140 and 142 at its upper and lower ends which are connected through suitable valves to a source of air under pressure to operate the piston rod 138. Thus, when air is admitted into the air cylinder 136 through the lower inlet port 142, the piston rod 138 is moved upwardly to move the sleeve 132 and the plunger plate 128 upwardly to a position shown in dashed lines in FIGURE 2. When air is admitted into the air cylinder 136 through the upper inlet port 140, the piston rod 138 is moved downwardly to move the sleeve 132 and the plunger plate 128 to the piston shown in full lines in FIGURE 2. When the plunger plate 128 is in its lowermost position, the ledge 130 is spaced from the ledge 120 of the plate 118 a distance equal to the height of the card 22. When the plunger plate 128 is in its uppermost position, the ledge 130 is just above the upper edge of the guide rails 110 and 112.

A second air cylinder 144 is mounted beneath the guide rails 110 and 112 on a support 146 extending between the brackets 114 and 116. The air cylinder 144 is positioned between and parallel to the guide rails 110 and 112. The piston rod 148 of the air cylinder 144 extends from the end of the air cylinder closest to the base 52, and a truncated conical ring 150 of an elastic material, such as rubber, is mounted on the end of the piston rod.

The other end of the air cylinder 144 is secured to the upper end of a vertically extending arm 152. The arm 152 is pivotally mounted at a point between its ends on a plate 154 which is secured to and extends from the support 146. A screw 156 is threaded through the arm 152 below the pivot point and engages a stop 158 extending from the plate 154. A spring 160 is connected under tension between the bottom end of the arm 152 and a bolt 162 threaded into the plate 154. The spring 160 holds the end of the screw 156 against the stop 158. By threading the screw 156 in or out, the air cylinder 144 can be tilted to adjust the position of the periphery of the ring 150 with respect to the guide rails 110 and 112 for reasons which will be explained later.

Referring to FIGURES 1 and 3, the electrical component transfer mechanism 46 comprises a transfer wheel 164 supported over the track 36 on the upper end of a shaft 166 which is rotatably supported on the base 52. The axis of the shaft 166 is in the same vertical plane as the axis of the shaft 82 on which the center drive wheel 40 is mounted. However, the shaft 166 is at a 45° angle with respect to the shaft 82 with the back end of the shaft 166 being the lower end. A beveled gear 168 is mounted on the lower end of the shaft 166. The gear 168 meshes with a beveled gear 170 on the shaft 82 so that the shaft 166 is driven by the motor 108 through the shaft 82.

Figure 4:
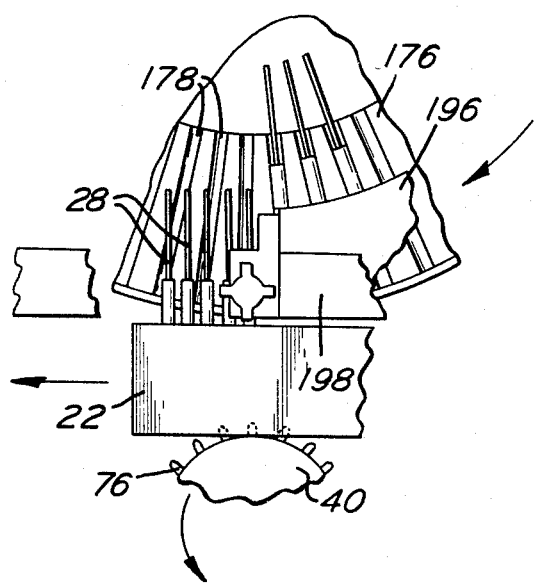
FIGURE 4 is a front elevational view of a portion of the electrical component transfer mechanism taken along line 4—4 of FIGURE 3.
Figure 5:
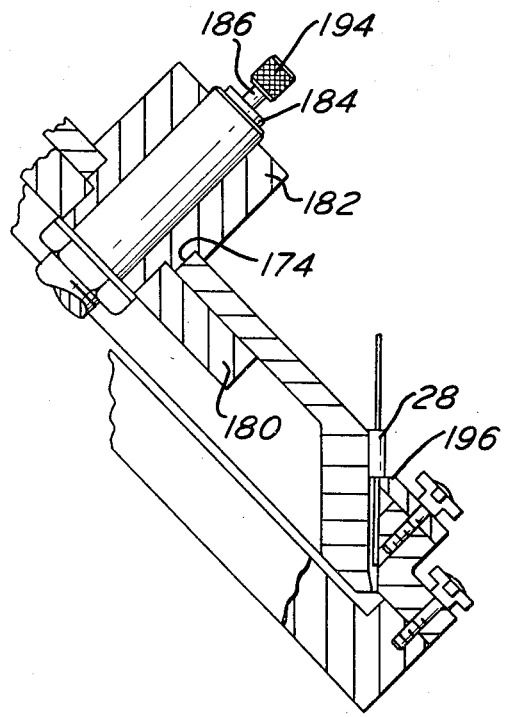
FIGURE 5 is a sectional view taken along line 5—5 of FIGURE 3.

The transfer wheel 164 comprises a flat, circular plate 172 having a central opening 174 therethrough, and a flat rim 176 extending rearwardly from the peripheral edge thereof. The internal angle between the rim 176 and the plate 172 is approximately 135°. The outer surface of the rim 176 is provided with a plurality of circumferentially spaced, radially extending grooves 178 (see FIGURE 4). As shown in FIGURE 3, because of the angle of the shaft 166 and the angle between the rim 176 and the plate 172, the groove 178 at the uppermost point of the wheel 164 extends horizontally, whereas the groove 178 at the lowermost point of the wheel extends vertically. As shown in FIGURE 1, the grooves 178 are arranged in groups with spaces between each group. The number of grooves 178 in each group equals the number of pockets in each of the cards 22.

The plate 172 of the wheel 164 is seated on a flat ring 180 which extends around the shaft 166 and is secured to a hub 182. The hub 182 is secured to the shaft so that the hub and the ring 180 rotate with the shaft. A cylinder 184, which is open at one end, is mounted on and extends through the plate 172 of the transfer wheel 164 with the open end of the cylinder facing the ring 180. A rod 186 extends longitudinally through the cylinder and is slidable therein. A head 188 is provided on the end of the rod 186 within the cylinder 184 with the head 188 fitting in a hole 190 in the ring 180. A helical spring 192 surrounds the rod 186 within the cylinder 184 and is compressed between the head 188 and the closed end of the cylinder. The spring 192 holds the head 188 in the hole 190 in the ring 180. A knob 194 is provided on the other end of the rod 186 by which the rod can be pulled to remove the head 188 from the hole 190 in the ring 180. Thus, when the head 188 is within the hole 190, the transfer wheel 164 rotates with the shaft 166, and when the head 188 is removed from the hole 190, the transfer wheel will not rotate with the shaft.

The transfer mechanism 46 is positioned so that the outermost edge of the rim 176 of the transfer wheel 164 at the lowermost position thereof is at the ledge 64 of the top rail 60 of the track 36. Thus, when the grooves 178 in the rim 176 reach a vertical position, they are directly in vertical alignment with the pockets in the cards 22. At the uppermost position of the transfer wheel 164, the rim 176 passes under the hopper 48 which feeds the electrical components 28 into the grooves 178 (see FIGURE 1). The transfer wheel 164 is rotated in a clockwise direction as viewed in FIGURE 1 to carry the electrical components 28 from the hopper 48 to the cards 22.

A substantially semi-circular guide plate 196 extends over the surface of the rim 176 of the transfer wheel 164 from just beyond the hopper 48 to the innermost edge of the wheel and is secured to the base 52. The plate 196 is of a width that it covers approximately one-half the width of the transfer wheel rim 176 from the outer edge of the rim. Thus, as the electrical components 28 are carried by the transfer wheel 164 from the hopper 48 to the cards 22, one terminal wire 32 of each of the components passes under the guide plate 196 so that the guide plate holds the components on the transfer wheel. As the transfer wheel 164 rotates, the electrical components slide radially outwardly in the grooves 178 until the ends of the body portions 30 engage and slide along the edge of the guide plate 196. At the lowermost end of the guide plate 196 is a stepped guide lip 198 which guides the electrical components 28 from the end of the guide plate into the cards 22. The inner surface of the guide lip 198 is spaced from the surface of the transfer wheel rim 176, a distance substantially equal to the diameter of the body portions 30 of the electrical components 28 so that the electrical components pass between the guide lip and the transfer wheel rim as they drop into the cards 22. As shown in FIGURE 3, a nozzle 200 is mounted on a post 202 in front of and above the guide lip 198. The nozzle 200 directs a blast of air against the electrical components 28 as they drop from the end of the guide plate 196 so as to hasten their falling into the cards 22.

Platform 50 is mounted on the base 52 at the left hand end of the track 36 as viewed in FIGURE 1. As shown in FIGURE 8, the platform 50 extends horizontally from the ledge 62 of the lower rail 58. The platform 50 has a central opening 204 therethrough which extends longitudinally therealong. A shaft 206 extends horizontally beneath the platform 50 and is supported at one end on the base 52 and at its other end in a block 208 secured to the bottom of the platform at the free end thereof. A slide block 210 extends through the opening 204 in the platform 50 and is slidably supported on the shaft 206. A plate 212 extends transversely over the platform 50 between the slide block 210 and the track 36. A shaft 214 extends transversely over the platform 50 and is slidably supported in the slide block 210. A pair of arms 216 are mounted on the ends of the shaft 214, and the plate 212 is secured to the arms 216. A handle bar 218 is also connected between the arms 216. Thus, the plate 212 can move longitudinally along the platform 50 with the slide block 210, and can be moved transversely across the platform by means of the handle bar 218. A push block 220 is secured to the front of the plate 212 at the right hand side thereof as viewed in FIGURES 1 and 9.

An air cylinder 222 is mounted in a bracket 224 on the back of the base 52 with the shaft 226 of the air cylinder being in alignment with the opening 204 in the platform 50. The air cylinder shaft 226 is connected to a plunger 228 which extends through an opening 230 in the base 52 and an opening 232 in the track 36. In the normally retracted position of the air cylinder shaft 226, the front end of the plunger 228 is within the opening 232 in the tracks 36. In the extended position of the air cylinder shaft 226, the plunger 228 is pushed out to engage the card 22 and move it off the track 36 and onto the platform 50. Another air cylinder 234 is mounted adjacent the left hand side edge of the platform 50 as viewed in FIGURE 9 at the end of the platform which is next to the track 36. The shaft 236 of the air cylinder 234 is perpendicular to the side edge of the platform 50. A clamping head 238 is mounted on the end of the air cylinder shaft 236. A clamping block 240 is mounted on the platform 50 at the right hand side thereof and in direct alignment with the clamping head 238. The air cylinder shaft 236 normally is in its extended position. In this position of the air cylinder shaft 236, the distance between the clamping head 238 and the clamping block 240 is slightly less than the length of a card 22. When the air cylinder 222 is actuated to move the plunger 238 forward so as to move a card 22 from the track 36 to the platform 50, the air cylinder 234 is actuated to retract the shaft 236 and then quickly return the shaft 236 to its normal extended position.

In the operation of the machine 34 of the present invention, a plurality of the empty cards 22 are stacked in the card hopper 44 by placing the cards within and between the guide rails 110 and 112. A weight 242 is placed on the last card 22 so as to press the cards together until the first card engages the plunger plate 128 (see FIGURE 2). The electrical component hopper 48 is filled with the electrical components 28 and the motor 108 is turned on to rotate the drive wheels 38, 40 and 42 and the transfer wheel 164. Air is then admitted into the lower inlet port 142 of the air cylinder 136 to lift the plunger plate 128 upwardly until the ledge 130 is above the upper edge of the first card 22 in the card hopper 44. This allows the first card 22 in the card hopper 44 to move forward under the ledge 130. Air is then admitted into the upper inlet port 140 of the air cylinder 136 to lower the plunger plate 128. This moves the first card 22 downwardly until it engages the ledge 120 of the plate 118. When the bottom edge of the card reaches the ledge 120, a pin 74 of the drive wheel 38 extends into one of the pockets of the card. Since the drive wheel 38 is rotating, the engagement between the pins 74 of the drive wheel and the card moves the card horizontally away from the plunger plate 128 onto and along the track 36. Thus, as soon as the card 22 reaches the ledge 120, it is moved horizontally along the track 36 by the drive wheel 38. The plunger plate 128 is then lifted upwardly to receive the next card 22 and feed it to the track 36. Thus, the cards 22 are consecutively fed from the hopper 44 to the track 36. Each time that the plunger plate 128 is cycled, air is admitted to the air cylinder 144 to move the ring 150 forward. The vertical position of the ring 150 is adjusted by the screw 156 so that the ledge of the ring engages and slides along the bottom edges of the cards 22 in the hopper 44. This is to ensure that as the cards are pushed around the bend in the hopper 44, the bottom edges of the cards move completely around to place the cards in a vertical position for proper feeding to the plunger plate 128.

As the cards 22 are consecutively fed from the hopper 44 to the track 36, the electrical components 28 are consecutively fed from the hopper 48 into the grooves 178 of the transfer wheel 164. The transfer wheel 164 carries the electrical components 28 along the guide plate 196 to a position directly over the axis of rotation of the drive wheel 40. At this position of the transfer wheel 164, the electrical components have reached the end of the guide plate 196 and are in a vertical position directly over the top edge of the cards 22. Since the distance between the axes of rotation of the drive wheels 38 and 40 is less than the length of the cards 22, the pins 76 on the drive wheel 40 will pick up the card 22 before the card leaves the drive wheel 38. The alignment of the axes of rotation of the drive wheel 40 and the transfer wheel 164, and the fact that the card 22 is moved along the track by the pins 76 fitting into the pockets in the cards ensures that a pocket of the card is directly under a groove 178 in the transfer wheel 164 when the groove 178 is in a vertical position. Thus, when the electrical component 28 reaches a vertical position, it passes beyond the end of the guide plate 196 and is free to drop downwardly behind the guide lip 198. The downward movement of the electrical component 28 is assisted by the air blast from the nozzle 200. As the electrical component drops downwardly, a pocket of the card is directly under the electrical component so that the terminal wire 32 drops into the pocket until the body portion 30 of the component is seated on the upper edge of the card. Thus, as the drive wheel 40 moves the card 22 along the track 36 under the transfer wheel 164, an electrical component 28 is dropped into each pocket of the card so as to fill the card with the electrical components.

The number of the grooves 178 in each group on the transfer wheel 164 corresponds to the number of electrical components to be placed in each card. The spacing between the groups of the grooves 178 corresponds to the spacing between the cards as they move along the track. In the event that a card becomes jammed as it is either fed to the track 36 or as it is moved along the track, or the electrical components become jammed as they are fed to the card, the rotation of the transfer wheel 164 can be stopped without turning off the machine by pulling on the knob 194 to pull the head 188 from the hole 190. This releases the transfer wheel 164 from the ring 180 so that the rotation of the shaft 166 does not rotate the transfer wheel.

After the card 22 is filled with the electrical components 28, it passes along the track 36 from the drive wheel 40 to the drive wheel 42. The drive wheel 42 moves the filled card to the end of the track 36 where the platform 50 is located. When the card 22 reaches the end of the track 36, the air cylinder 222 is actuated to move the plunger 228 forward. This pushes the card from the track onto the platform 50. At the same time, the air cylinder 234 is actuated to retract the shaft 236 and allow the card to move onto the platform 50 between the clamping head 238 and the clamping block 240. The shaft 236 is quickly returned to its extended position so as to clamp the card in an upright position between the clamping head 238 and the clamping block 240. As each additional filled card 22 is moved off the track and onto the platform 50, the first filled card is moved along the platform until the card passes the edge of the clamping head and clamping block. The card 22 then comes into contact with the plate 212 which was moved along the platform 50 to the card. The plate 212 maintains the card in its upright position. As additional filled cards are moved onto the platform 50, the plate 212 is moved along the platform. When a sufficient number of the filled cards have passed the clamping head 238 and clamping block 240, the plate 212 can be moved to the left by means of the handle 218. This brings the push block 220 into engagement with the ends of a few of the filled cards and pushes the cards off the edge of the platform 50. The cards are then picked up manually and placed in suitable boxes. The plate 212 is then slid back to its position on the platform 50 to pick up the next group of the filled cards. Thus, small groups of the filled cards can be easily removed from the platform without interfering with the feeding of the cards from the track 36 to the platform 50.

The present invention may be embodied in other specific forms without departing from the spirit or essential attributes thereof, and, accordingly, reference should be made to the appended claims, rather than to the foregoing specification as indicating the scope of the invention.

We claim:

1. A machine for assembling electrical components of the type having a central body portion and terminal wires extending axially from opposite ends of the body portion in a flat, rectangular, corrugated paper card package in which the corrugations provide aligned openings along the opposed top and bottom edges of the card, said machine comprising:

(a) a horizontally extending track adapted to support the cards along one of said opposed edges with the cards being in an upright uposition so that openings are exposed along the top edge of the cards;

(b) means adjacent one end of the track for consecutively feeding the cards to the track in the upright position;

(c) means engageable with the openings in the bottom of each of the cards for moving the cards along the track from said card feeding means toward the other end of the track, said means comprising a plurality of drive wheels mounted in spaced relation along and beneath the track, means for simultaneously rotating said wheels in the same direction, and means on the peripheries on said wheels engageable with the cards to move the cards along the track as the wheels rotate;

(d) means synchronized with said card moving means for consecutively feeding the electrical components in a vertical, upright position to a point over the track and dropping the individual electrical components sequentially onto the upper edge of the cards as they move along the track so that a terminal wire of each of the electrical components extends into a separate opening in the upper edge of the card, said means comprising a transfer wheel mounted over one of said drive wheels for rotation about an axis which is in the same vertical plane as the axis of rotation of said one drive wheel and which is at a 45° angle with respect to the horizontal, said transfer wheel comprising a flat, circular plate and a flat, annular rim around the periphery of the plate and extending at an angle with respect to the plate, said plate being perpendicular to the axis of rotation of the transfer wheel, and the internal angle between the plate and the rim being approximately 135°, said rim having a plurality of spaced grooves in its outer surface extending radially across the rim, said grooves being adapted to receive the electrical components, the transfer wheel being positioned with the outer edge of the rim at its lowermost position being directly over the path of the upper edge of the cards, and means for rotating said transfer wheel; and (e) means adjacent the other end of the track for moving the cards from the track.

2. A machine in accordance with claim 1 including a platform extending horizontally from the track at the other end thereof, said platform adapted to receive the cards as they are removed from the track, and means for supporting the cards in an upright position on the platform.

3. A machine in accordance with claim 1 in which there are three drive wheels, one of said drive wheels being positioned adjacent the means for feeding the cards to the track so that as each card is fed to the track it is engaged by the one wheel and moved along the track, a second wheel being positioned adjacent the means for moving the cards from the track, the third drive wheel being located between the other two wheels, and the distance between the third wheel and each of the other two wheels being less than the length of a card.

4. A machine in accordance with claim 3 in which the means on each of the wheels for engaging the cards comprises a plurality of pins uniformly spaced around the periphery of the wheel and projecting radially outwardly from the wheel, the pins being adapted to extend into the openings in the bottom edge of the cards to engage the cards and the spacing between the pins being substantially equal to the spacing between the openings in the card.

5. A machine in accordance with claim 4 in which the means for feeding the electrical components to the cards is mounted over the third drive wheel and drops the electrical components into the openings in the cards as the openings pass over the third drive wheel.

6. A machine for assembling electrical components of the type having a central body portion and terminal wires extending axially from opposite ends of the body portion in a flat, rectangular, corrugated paper card package in which the corrugations provide openings along opposed edges of the card, said machine comprising:

(a) a horizontally extending track adapted to support the cards along one of said opposed edges with the cards being in an upright position so that the openings are exposed along the top edge of the cards;

(b) means adjacent one end of the track for consecutively feeding the cards to the track in the upright position;

(c) means for moving the cards along the track from said card feeding means toward the other end of the track, said means comprising three drive wheels mounted in spaced relation along and beneath the track, means for simultaneously rotating said wheels in the same direction, and means on the periphery of said wheels engageable with the cards to move the cards along the track as the wheels rotate; one of said drive wheels being positioned adjacent the means for feeding the cards to the track so that as each card is fed to the track it is engaged by the one wheel and moved along the track, a second wheel being positioned adjacent the means for moving the cards from the track, the third drive wheel being located between the other wheels, and the distance between the third wheel and each of the other two wheels being less than the length of a card; said means on each of the wheels for engaging the cards comprising a plurality of pins uniformly spaced around the periphery of the wheel and projecting radially outwardly from the wheel, the pins being adapted to extend into the openings in the bottom edge of the cards to engage the cards and the spacing between the pins being substantially equal to the spacing between the openings in the card;

(d) means for consecutively feeding the electrical components in a vertical, upright position to a point over the track and dropping the electrical components on to the upper edge of the cards as they move along the track so that a terminal wire of each of the electrical components extends into a separate opening in the upper edge of the card, said means being mounted over the third drive wheel and being positioned to drop the electrical components into the openings in the cards as the openings pass over the third drive wheel, said feeding means comprising a transfer wheel mounted over the third wheel for rotating about an axis of rotation of the third wheel and which is at a 45° angle with respect to the horizontal, and means for rotating said transfer wheel; said transfer wheel comprising a flat, circular plate and a flat, annular rim around the periphery of the plate and extending at an angle with respect to the plate, said plate being perpendicular to the axis of rotation of the transfer wheel, and the internal angle between the plate and the rim being approximately 135°, said rim having a plurality of spaced grooves in its outer surface extending radially across the rim, said grooves being adapted to receive the electrical components, the transfer wheel being positioned with the outer edge of the rim at its lowermost position being directly over the path of the upper edge of the cards; and (e) means adjacent the other end of the track for moving the cards from the track.

7. A machine in accordance with claim 6 including a substantially semi-circular guide plate fixedly mounted over the outer surface of the rim of the transfer wheel and extending between the uppermost position of the rim to the lowermost position of the rim in the direction that the transfer wheel rotates, the guide plate covering a portion of the outer surface of the rim from the outer edge of the rim so as to retain the electrical components in the grooves in the rim as the transfer wheel rotates.

References Cited

UNITED STATES PATENTS 2,829,477  4/1958  Folly _____ 53—246 X

THERON E. CONDON, Primary Examiner

R. L. SPRUILL, Assistant Examiner

U.S. Cl. X.R.

53—159